United States Patent [19]

Foxcroft

[11] 4,295,510

[45] Oct. 20, 1981

[54] PROTECTIVE TIRE CHAIN ASSEMBLY

[75] Inventor: Garth Foxcroft, Wynberg, South Africa

[73] Assignee: Dirk Marinus Brink, White River, South Africa

[21] Appl. No.: 53,224

[22] Filed: Jun. 29, 1979

[30] Foreign Application Priority Data

Jul. 7, 1978 [ZA] South Africa .................. 78/3906

[51] Int. Cl.³ .................. B60C 27/22; B60C 27/20
[52] U.S. Cl. .................. 152/220; 152/224; 152/243; 152/244; 301/44 A
[58] Field of Search .................. 59/78, 84; 152/224, 152/225 R, 243, 244, 245, 220; 301/44 A

[56] References Cited

U.S. PATENT DOCUMENTS

| | | | |
|---|---|---|---|
| 1,368,049 | 2/1921 | Plaisted | 301/44 A |
| 1,749,636 | 3/1930 | Keiser . | |
| 2,008,210 | 7/1935 | Hipkins | 152/220 |
| 2,080,675 | 5/1937 | Sponseller | 301/44 A |
| 2,415,270 | 2/1947 | Allardice | 152/245 |
| 2,433,436 | 12/1947 | Cook | 152/225 |

FOREIGN PATENT DOCUMENTS

| | | |
|---|---|---|
| 2109876 | 9/1971 | Fed. Rep. of Germany . |
| 2257145 | 6/1974 | Fed. Rep. of Germany . |
| 2537661 | 3/1977 | Fed. Rep. of Germany . |
| 356684 | 12/1905 | France . |
| 858389 | 11/1940 | France . |
| 1215122 | 4/1960 | France . |
| 2287352 | 5/1976 | France . |
| 29102 | of 1910 | United Kingdom . |
| 131423 | 8/1919 | United Kingdom . |
| 212503 | 3/1924 | United Kingdom . |
| 1290995 | 9/1972 | United Kingdom . |

*Primary Examiner*—Robert A. Dawson
*Attorney, Agent, or Firm*—Lee, Smith & Jager

[57] ABSTRACT

A tire chain assembly comprising a tire chain wherein the spaces between the links of the chain are, at least partly, occupied by a wear resistant elastomeric material such that the combination of the material and tire chain form a belt adapted to be removably located over a tire of suitable size.

10 Claims, 9 Drawing Figures

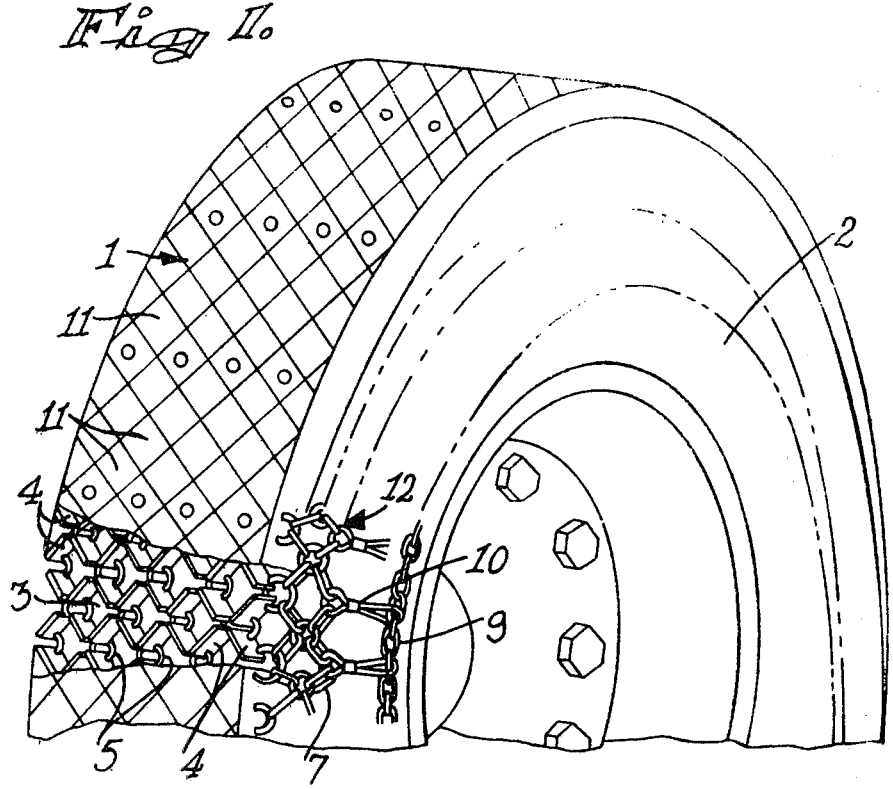
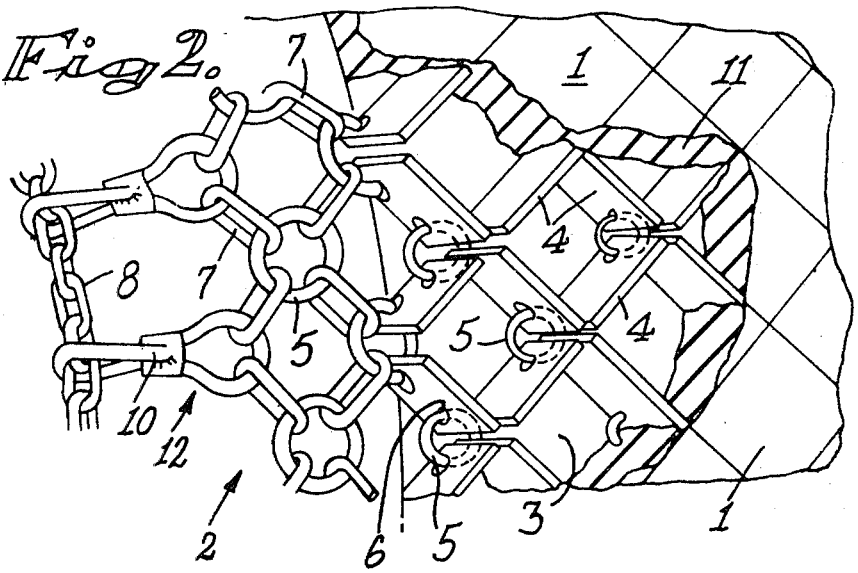

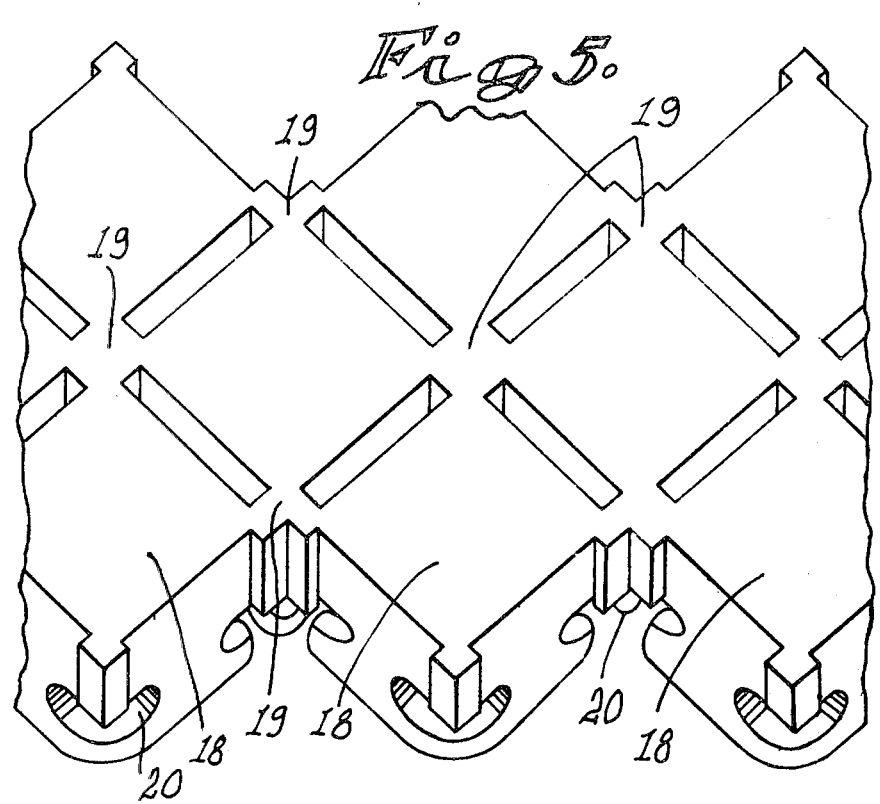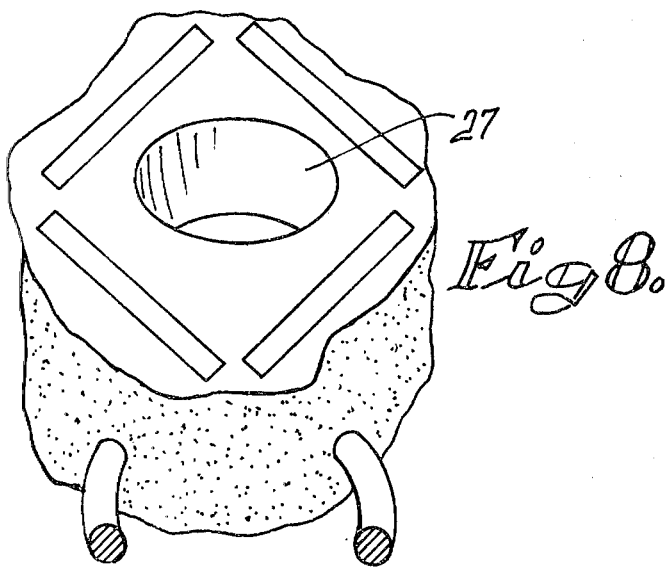

PROTECTIVE TIRE CHAIN ASSEMBLY

This invention relates to tire protective chains and, more particularly, to tire protective chains of the type widely used on tires subjected to very severe operating conditions such as may exist in quarries and other areas where abrasive surfaces are to be traversed.

Very often tire protective chains are applied to earth moving equipment but their use is not confined to such equipment.

Tire protective chains of the type at present in use generally comprise a large number of short plates adapted to be located on a tire in an on-edge relationship and wherein links interconnect such plates to maintain them in that relationship. The edges of the plates thus accept the vast majority of the wear and protect the tire surface appreciably against the abrasive action of the surface being traversed.

Numerous different types of tire chains have been proposed and one form of tire chain which has met with appreciable success is one where an uncured rubber material as applied to the prepared outer surface of a tire and a tire chain is then located thereover. The tire chain is then pulled radially into the uncured rubber which is subsequently cured.

The rubber thus bulges out of the spaces between the plate-like links and occupies a large percentage of the volume between the chain links.

However, this prior art arrangement does not enable the tire chain to be removed as and when required and also replacement of a tire chain is extremely difficult since the rubber when cured, becomes bonded to the tire rubber itself. However, the life of a tire chain having rubber filling the interstices between the chain links has been found to be exceptionally good.

It is the object of this invention to provide an improved form of tire chain wherein the tire chain is removable from the tire but the wearing life thereof is at least as good as, if not better than, the above described prior art arrangement.

In accordance with this invention there is provided a tire chain assembly comprising a tire chain wherein the spaces between the links of the chain are occupied by a wear resistant elastomeric material such that the combination of the material and tire chain form a belt adapted to be removably located over a tire of suitable size.

Further features of the invention provide for the belt to be either endless or to have joining members provided at each end, for the elastomeric material to be either a rubber or a polyurethane composition in which case the polyurethane may be somewhat foamed or it may be solid. In one form of the invention the polyurethane or other synthetic, wear resistant elastomer is actually cast onto the chain so that it can even fill the interstices formed between connecting links and apertures through which they pass. In such a case, substantially all access to abrasive dust or the like is excluded from the interior of the chain.

Alternatively, the material located between the links may be in the form of blocks or bands of moulded material adapted to clip into position by co-operation with the chain links. In such a case, the individual moulded elements of material may be driven into co-operation with the links of a chain percussively, say by use of a hammer or the like.

The inner surface of the composite tire chain assembly may be provided with inwardly directed formations for locating it relative to a tire in a desired position. In particular, it is possible to provide a single tire chain assembly of the above described type having a central inwardly directed circumferentially extending ridge for co-operation with a double wheel assembly of a transport vehicle, for example. The circumferentially extending ridge is adapted to extend into the space between the two tires of the double wheel assembly and thereby locate the tire chain assembly on the double wheel assembly.

Any other type of formation may be provided on the inside of the composite tire chain assembly, for example to co-operate with tread patterns on the tire or other formations provided specifically for the purpose of locating the band thereon.

It will be understood that in any of the above described cases the band may be made to a slightly larger diameter than the outer circumference of the tire to facilitate its installation laterally onto the tire. The edge regions of the tire chain itself can then be tensioned in the usual way by drawing them together by means of a chain extending in a circular path around the sidewall of the tire and which can be shortened as required to effect tensioning of the chain. This tensioning of the chain has the effect of pulling the linkages of the chain sideways which, in turn, has the effect of decreasing the effective diameter of the tire chain assembly so that it contacts the tire firmly in use.

It will be understood that many different ways of introducing the elastomeric material between the links of a chain can be utilised depending on requirements and the actual structure to be achieved. Thus, the chain may be located in a mould of annular cross-section in which case the desired region of the chain can be filled with say, polyurethane material, by casting the polyurethane into the mould. The mould would be dimensioned to accommodate the desired height of the link in the chain and the chain would generally be suspended in the mould with the tread region extending vertically and with the chain arranged horizontally in a circular configuration.

In cases where prefabricated blocks or bands of resilient material are formed and adapted to be clipped into the tire chain for use, the Shore hardness of the blocks or bands to be used near the edges of a tread surface could be made to be less than that of the blocks to be used in the central region. In this manner, the central region which is subjected to the greatest amount of wear would be provided with the hardest, and most wear resistant, blocks whilst those near the edges of the tire chain could be softer and thus longer lasting.

Also it is possible to provide such different hardnesses of blocks at an inner or outer region of the tire chain as may be required and dictated by expedience and circumstances.

In order that the invention may be more fully understood, various embodiments thereof will now be described with reference to the accompanying drawings in which:

FIG. 1 illustrated a tire chain assembly according to the invention in perspective outside view on a tire;

FIG. 2 illustrates, in part, a tire chain as illustrated in FIG. 1 but from the opposite side or inside and on an enlarged scale;

FIG. 5 is a similar illustration of a series of interconnected blocks defining a band or strip for installation in a tire;

FIG. 8 illustrates an alternative central region to a space within a link arrangement of a tire chain which can be utilised if required; and, FIG. 9 is an isometric view of a section of chain illustrating an alternative form of block.

Figure 3:
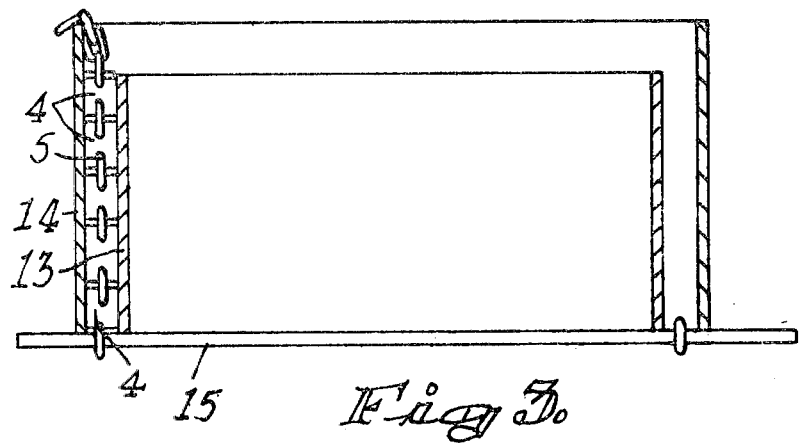
FIG. 3 is a sectional elevation of a mould utilised for forming a tire chain assembly as illustrated in FIGS. 1 and 2.

As illustrated in FIG. 1, a tire chain assembly, in this particular instance, is formed as a belt 1 substantially equal to the width of a tread of a tire 2 on which the assembly is to be used. The tire chain in this belt region is composed of a series of substantially rectangular apertures 3 arranged such that the diagonals thereof extend in a substantially circumferential direction. Each of these substantially square apertures is defined by four plate-like, wear accepting chain elements 4 adapted to be orientated such that they are located "on-edge" in use. At least the outermost edge region of each of these plate-like chain elements is specially hardened so as to be wear resistant to a satisfactory extent.

The plate-like chain elements 4 are interconnected at each of the corners of the square apertures 3 by means of circular chain elements 5 passing through holes 6 suitably located in the plate-like elements 4. It is preferred that these holes 6 be located appreciably nearer the edge of the plate-like elements contacting a tire in use rather than nearer the outermost and wear accepting edge. In this manner, the maximum wear can be obtained from a tire chain as is known in the art.

The edge regions of the belt arrangement 1 described above are provided with extensions to the chain in which the plate-like links are replaced by elongated oval links 7 which, in use, protect the sidewalls of a tire.

The peripheral zones of the tire chain are provided with a fixed length chain 8 on the inside periphery of the tire chain and a variable length chain 9 on the outer side of the tire chain assembly in use. The tensioning chains 8 and 9 both pass through special links 10 provided at the peripheral areas of the tire chain for the purpose of receiving the tensioning chain therethrough. Clearly the tensioning chain could be replaced by any other suitable tensioning member.

As provided for by this invention, the central region of the tire chain adapted to present itself to the ground in use and mentioned above as the central belt 1, has polyurethane material cast into the chain so as to form a composite belt together with the links. The polyurethane material indicated by numeral 11 is preferably slightly foamed so as to increase its resilience and, in this case, it is located on the chain by a casting process described below.

The sidewall regions 12 of the tire chain having the oval links, need not be embodied in wear resistant polymeric material as in the case of the central belt region, but if required, these regions of the tire chain could be so protected. However, it is envisaged that if these regions of the tire chain are filled with polyurethane or other elastomeric material, it should be appreciably softer than in the case of the material in the central belt region.

Whilst polyurethane material is mentioned above, it will be understood that any other suitable elastomer having appropriate wear resistant properties could be utilised in its stead.

In the embodiment of the invention just described the polyurethane material is cast into the chain. In order to achieve this, a mould assembly as illustrated in FIG. 3 is utilised.

The mould assembly simply comprises a mould member 13 in the form of an inner cylindrical member conveniently made of metal plate. The diameter of this circular member is chosen according to the outer diameter of a tire with which the chain assembly is to be utilised.

An outer mould member of cylindrical shape is located concentrically relative to the first, this outer mould member 14 being circumferentially expansible and forming, with the inner mould member, an annular cavity which is to be equal in radial dimension to approximately the height of the plate-like chain elements 4. Thus, with the central belt region of the chain suspended between the two mould defining members, and a bottom 15 to the mould, the chain can simply be suspended in position in the mould with the lowermost links touching the bottom of the mould and possibly located in recesses therein. This latter feature is designed to enable the remainder of the chain to be built onto the central belt region after the polyurethane material in this case has been cast.

The polyurethane material is mixed and then cast into the mould to the required height and in order to assist in the correct height being obtained, the height of the inner mould member could be substantially less than that of the outer mould member and substantially equal to the desired total width of the belt region of the composite tire chain assembly. Also, the provision of the somewhat higher outer mould member enables it to be used as a suspension member from which the chain can be suspended in the mould.

It will be understood that the polyurethane mix utilised in order to define a central belt section of a tire chain as described above, can be selected according to requirements. Preferably, as already mentioned, the polyurethane material will be slightly foamed in order to increase its resilience and flexibility.

After the central belt region has been manufactured as above described, the sidewall regions can be attached thereto in conventional manner.

It will be understood that many other methods of manufacturing a tire chain according to this invention could be utilised. In particular, the elastomeric material utilised to fill the spaces between the chain links could be a rubber material of either natural or synthetic type or other synthetic elastomers such as neoprene, if required. Where an uncured rubber is to be utilised, it would be pressed suitably into the spaces between the chain links. Also, the formation of the chain assembly could take place in strip form, in which case the ends of suitable lengths of strip could be joined together by any suitable means in order to define a band. This arrangement, if a suitable joining means is provided, can be most useful in that it greatly facilitates installation on a tyre which is already located on a wheel on a vehicle.

It has been found that in use tire chains made as above described are extremely effective in decreasing the wear on such chains and also on the tires with which they are used. It has been found that the protective layer provided by the continuous band of elastomeric material prevents, to a large extent, wear from taking place on the original tire and therefore, preserves to a great extent the tire itself. The lasting capabilities of the tire chain of this invention have been appreciably better than in the case of prior art tire chains.

The invention also provides the advantage that the tire chain can be relatively simply removed for on the road use of the vehicle usually requiring such tire chains and can be re-installed thereon for off the road use.

Figure 4:
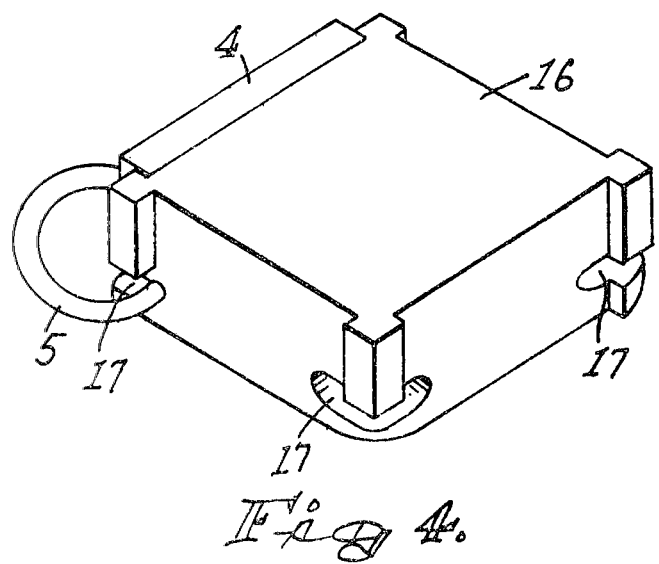
FIG. 4 is an isometric view illustrating a block suitable for installation in a tire chain according to the invention to define the filling material between the links thereof.

Many different constructions of a tire chain assembly according to this invention are possible. Thus, for example, as illustrated in FIG. 4, blocks of solid or somewhat foamed polyurethane or, in fact, any other elastomeric material may be made as illustrated. In this particular case, the blocks are made for co-operation with a tire chain having substantially square apertures therein as described above. In such a case, each block 16 is provided at its operatively inner region with recesses 17 in the corner regions thereof and these recesses are shaped and positioned so as to co-operate with the inwardly directed arcuate section of the interconnecting circular elements 5 of the chain. The blocks themselves are substantially rectangular in shape and are dimensioned so as to fit tightly in the rectangular space defined by four co-operating plate-like chain elements. The blocks may be adapted to be driven into position with the chain either in an installed condition on the tire, or alternatively, prior to installation.

Blocks as above defined may be made in bands or rows thereof wherein the individual blocks 18 are interconnected by portions 19 of material adapted to pass between the adjacent ends of the plate-like chain elements which, in fact, do not meet to define a completed corner to the rectangular aperture. Thus, rows or bands of the blocks can be interconnected by means of these portions of material which extent in a diagonal direction relative to the square apertures in the chain.

It will be understood that these bands of blocks may be utilised to extend across the width of a tire chain, or alternatively, circumferentially. In this particular case, the blocks are made to co-operate, by way of recesses 20, with the circular elements of the chain which are used to interconnect the plate-like chain elements.

Figure 6:
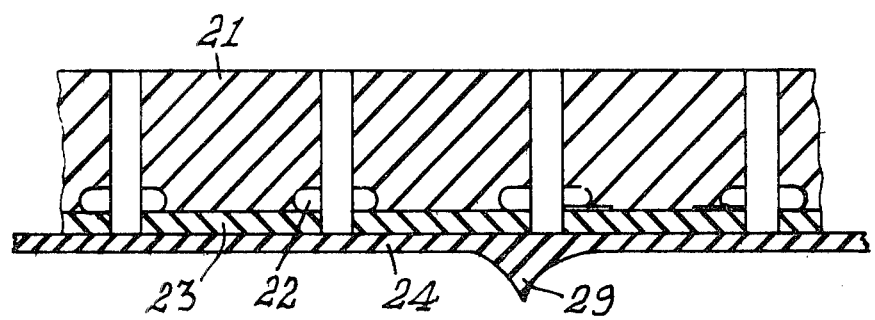
FIG. 6 is a cross-section taken across a fabricated tire chain assembly according to the invention.

An alternative form of this aspect of the invention is illustrated in FIG. 6 in which case the blocks 21, which may be interconnected as bands or may be individual blocks, are simply provided with recesses 22 adapted to receive the circular chain elements but not to lock onto such chain elements. A layer of elastomeric material 23 may then be bonded onto the innermost surface of each block 21 so that this layer of material extends beneath the circular elements. In this way, the blocks are locked onto the tire chain provided that the layer 23 of material is sufficiently strong. The layers of material and, in fact, the plate-like links may further be bonded to a sub-strata sheet of material 24 which is to be positioned, in use, between the plate-like elements and the tire proper. FIG. 6 also illustrates a ridge 29 of a type suitable for locating a belt relative to a double wheel assembly for example.

It is considered that various materials of manufacture could lend themselves to the latter construction of the tire chain and, in particular, a soft type of rubber sold under the trade name "LINATEX" could be utilised for this type of construction.

Figure 9:
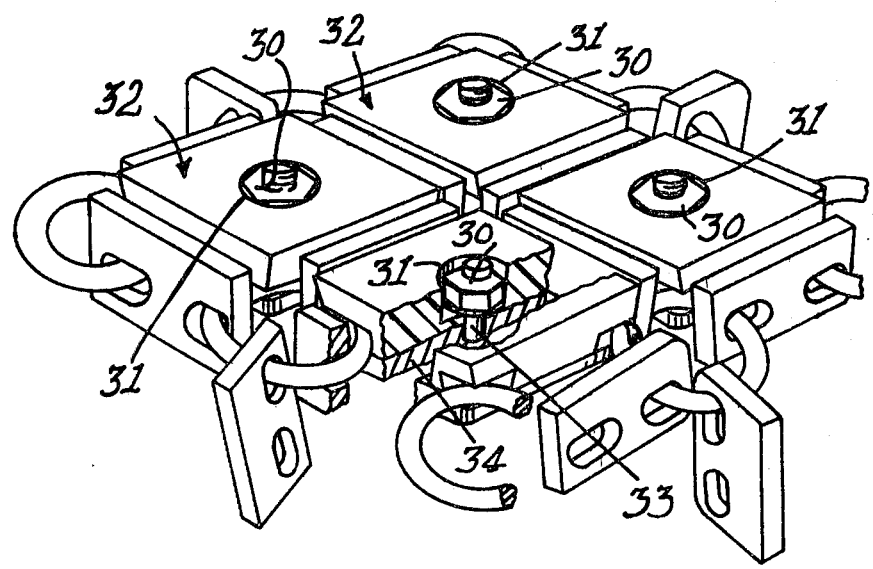

Blocks shaped as just described with the recesses to accommodate the connecting links could, as shown in FIG. 9, be secured in position by a countersunk nut 30 located in a recess 31 in the outer surface 32 of a block the nut co-operating with a stud 33 carried on a metal or other plate 34 in place of the layer of elastomeric material 23.

Figure 7:
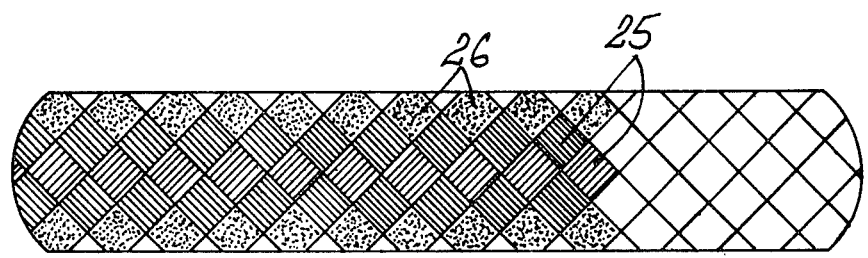
FIG. 7 is an elevation of a tire chain embodying prefabricated blocks in the spaces between links thereof.

As shown in FIG. 7, the central blocks 25 could be made to a different Shore hardness from those 26 towards the edge of the tire. This may be provided for the purpose of achieving a better traction and also better wear resistance in the central region.

It will be understood that numerous variations may be made to the above described embodiments of the invention without departing from the scope hereof which is limited solely to the provision of a tire chain which is separate from a tire and wherein the spaces between the chain elements are substantially filled with an elastomeric material which is cured to provide suitable wear resistant properties.

Such wear resistant properties may even be achieved by providing recesses in blocks of material located, for example, in square apertures defined in the chain as above mentioned with the intention that such recesses are shaped to receive compacted ducts from a quarry or road being traversed by the tire chain in use. Such a recess is illustrated by numeral 27 in FIG. 8 which shows a modified form of the invention.

In any of the cases where the blocks are utilised a polyurethane adhesive may be applied to the chain prior to installation of the blocks therein. Also, holes 28 (See FIG. 1) may be provided in the elastomeric material in rows across the central belt region to provide additional deformability to enable the chain to be tightened into contact with a tire. If required, the plate-like links could be replaced by any suitable links of another configuration, such as thin high tensile steel sheet or plate embodied in a fairly rigid elastomeric covering which forms part of the structural link itself and is present in addition to the generally softer elastomeric material in the spaces defined by the links.

The elastomeric material, whether in the form of blocks, bands or in the form of it having been applied to the chain to cure thereon, can be utilised as an anchorage for extremely hard wearing elements which are not susceptible to machining, welding or the like. Also, if required, blocks as above described could be made to stand proud of the chain either in whole or in part to provide special traction characteristics under special conditions such as in mud or clay.

The invention therefore provides a simple, yet effective, expedient for the purpose of prolonging the life of tire chains and also for protecting tires against damage thereto when used in combination with such tire chains. In addition, tire chains of this type have been found to be substantially quieter than conventional tire chains in operation.

What I declare as new and desire to secure by Letters Patent is:

1. A tire chain assembly comprising a tire chain having an endless central belt region composed of wear accepting links with connecting links interconnecting said wear accepting links, and having sidewall protecting extensions along the edges of the central belt region and wherein the spaces between the links of the chain are, at least partly, occupied by a wear resistant elastomeric material such that the combination of the material and tire chain form said central belt region having the wear accepting links extending through substantially the entire thickness of such belt region, the tire chain being adapted to be removably located over a tire of suitable size.

2. A tire chain assembly as claimed in claim 1 in which the elastomeric material is rubber.

3. A tire chain assembly as claimed in claim 1 in which the elastomeric material is an optionally foamed polyurethane material or other synthetic wear resistant elastomer.

4. A tire chain assembly as claimed in claim 3 in which the polyurethane or other elastomer is cast onto the chain to fill the interstices between the links thereof.

5. A tire chain assembly as claimed in claim 1 in which the material located between the links is in the form of blocks or bands of moulded material provided with retaining means for maintaining them in position by co-operation with the chain links.

6. A tire chain assembly as claimed in claim 5 in which the blocks or bands are shaped to clip onto connecting links used to interconnect separate wear accepting links.

7. A tire chain as claimed in claim 5 in which the retaining means is a plate having a stud thereon, the plate being shaped for location and retention on the inner side of the chain and the block is retained on the chain by co-operation of a countersunk nut with said stud.

8. A tire chain assembly as claimed in claim 1 in which the belt is provided with inwardly directed formations for locating it relative to a tire in a desired position.

9. A tire chain assembly as claimed in claim 8 in which the belt is adapted to encompass both types of a double wheel assembly and said formations are constituted by an inwardly directed circumferentially extending ridge for co-operation with the gap between the tire of the double wheel assembly.

10. A tire chain assembly as claimed in claim 1 in which the tire chain itself is composed of a series of plate-like wear accepting links adapted to be orientated "on-edge" in use and which are interconnected by a series of interconnecting links passing through apertures in the plate-like links.

* * * * *